UNITED STATES PATENT OFFICE.

FREDERICK LAIST AND JAMES ORR ELTON, OF ANACONDA, MONTANA, ASSIGNORS TO ANACONDA COPPER MINING COMPANY, OF ANACONDA, MONTANA, A CORPORATION OF MONTANA.

PROCESS OF RECOVERING ZINC FROM ORES.

1,255,439.     Specification of Letters Patent.     Patented Feb. 5, 1918.

No Drawing.     Application filed July 10, 1916. Serial No. 108,462.

*To all whom it may concern:*

Be it known that we, FREDERICK LAIST and JAMES ORR ELTON, citizens of the United States, residing at Anaconda, in the county of Deerlodge and State of Montana, have invented certain new and useful Improvements in Processes of Recovering Zinc from Ores, of which the following is a specification.

In a copending application Serial No. 104,083, filed June 16, 1916, we have pointed out that impure zinc-bearing solutions, such for example as those prepared by leaching calcined zinc ores with dilute sulfuric acid, may advantageously be purified by agitating the solutions with an electrolytically deposited zinc sponge, either with or without preliminary drying of the sponge. We have also pointed out in the said application that a zinc sponge suitable for the above purposes may be prepared by the electrolytic decomposition of impure zinc-bearing solutions; and that in the course of such electrolysis the solution will become partially or completely purified, according to its rate of flow through the cells in which the sponge is deposited.

The present invention comprises a process of preparing from suitable zinc ores a highly purified zinc-bearing solution suitable for the electrolytic decomposition of zinc in reguline form. The process in its preferred embodiment is cyclical in character, and may be carried out as follows:—

The calcine from the roasting furnaces is leached with a dilute sulfuric acid solution in order to dissolve the zinc. As is hereinafter explained this acid solution, in a repetition of the process, is preferably the effluent from the electrolytic cells in which the zinc is deposited. The solution from the leaching operation is oxidized if necessary, and any ferric iron therein is precipitated by an excess of calcine, or by limestone, or in any other approved manner. This precipitation of iron may be accomplished either before or after the filtration of the solution as may be desired.

The resulting iron-free solution is now agitated with zinc dust or sponge for the removal of copper, cadmium and other relatively electronegative impurities. For this treatment the zinc sponge prepared by the electrolysis of purified or partly purified zinc solutions has been found especially effective, and we prefer therefore to employ in this step of the process the zinc sponge which is obtained at a later stage of the process, as described below, using the same either in the form of wet sponge, or after drying *in vacuo*, in a current of inert gas, or otherwise, under strictly non-oxidizing conditions.

After filtering out the precipitated impurities a completely neutral solution is obtained, which is usually practically free from impurities, and is collected in storage tanks. From these tanks a part or all of the solution flows through a series of electrolytic cells in which are suspended anodes of zinc, and cathodes which are advantageously of aluminum. In these cells conditions are maintained whereby a portion of the zinc in the solution is deposited in the form of sponge, the quantity thus deposited being adequate for the primary purification of the electrolyte as described above. The best conditions for the deposition of sponge are a low voltage, and a cold and particularly a neutral solution. Under these conditions zinc dissolves from the anodes as rapidly as it is deposited at the cathodes, thus maintaining the neutrality of the solution.

From these zinc sponge cells the solution flows to the regular depositing cells, being mixed if desired with purified solution from the storage tanks, and having added thereto a sufficient proportion of the return acid solution (the effluent from these depositing cells) to give the required acidity. In this second series of cells, the conditions are maintained for obtaining a reguline deposit of zinc. For this purpose we prefer an acidity of about 4.5 per cent., the solution being electrolyzed with lead or other insoluble anodes at a temperature of approximately 35° C. Suitable current conditions are a potential difference of 3 to 4 volts, with a current density of 0.0215 to 0.0323 amperes per square centimeter of active electrode surface.

The effluent solution from these cells usually contains from two to three per cent. of zinc and from four to eight per cent. of free acid, and is used for leaching fresh quantities of calcine, the operation being therefore cyclical in character.

It is to be noted that according to the present process the zinc sponge obtained by electrolytic precipitation from a solution which has already undergone a primary purification by means of finely-divided zinc, is itself used for this primary purification. Therefore the sponge-precipitating cells serve a double purpose: In the first place, they produce the sponge used for the primary purification; and in the second place, in producing this sponge, they subject the solution to a second and final purification, which under certain operating conditions may be highly important. For example, in case traces of copper or cadmium escape the primary purification, they are effectively removed by the secondary treatment in these cells; and it furthermore appears that residual traces of arsenic are more effectively removed by these electrolytic cells (being eliminated as arsin) than by the primary treatment; although the bulk of the arsenic is eliminated in combination with ferric iron in the first stage of the operation.

We claim:—

1. The process of recovering zinc from its ores, which consists in leaching the ore with an acid solvent for zinc, precipitating iron as a ferric compound, treating the resulting solution with finely-divided zinc to precipitate metals electronegative thereto, electrodepositing zinc in sponge form from portions of the treated solution, thereby further purifying such portions of the solution and preparing finely-divided zinc for use in the precipitating stage of the operation, depositing further quantities of zinc as reguline metal, and re-using the resulting acid solution in the leaching process.

2. In a process of recovering zinc from its ores, the steps which consist in successively treating an impure zinc-bearing solution with finely-divided zinc to precipitate metals electronegative to zinc, electrodepositing a portion of the zinc in the form of sponge from the thus-treated solution, and depositing further quantities of zinc from the purified solution as reguline metal.

3. In a process of recovering zinc from its ores, the steps which consist in successively treating an impure zinc-bearing solution with finely-divided zinc to precipitate metals electronegative to zinc, depositing a portion of the zinc in the form of sponge from the thus-treated solution by electrolyzing the same with anode surfaces of zinc, and depositing further quantities of zinc from the purified solution with insoluble anodes.

In testimony whereof, we affix our signatures.

FREDERICK LAIST.
JAMES ORR ELTON.